July 20, 1965 L. J. CULVER 3,195,229
METHOD OF BUTT WELDING METAL TUBES
Filed May 21, 1962
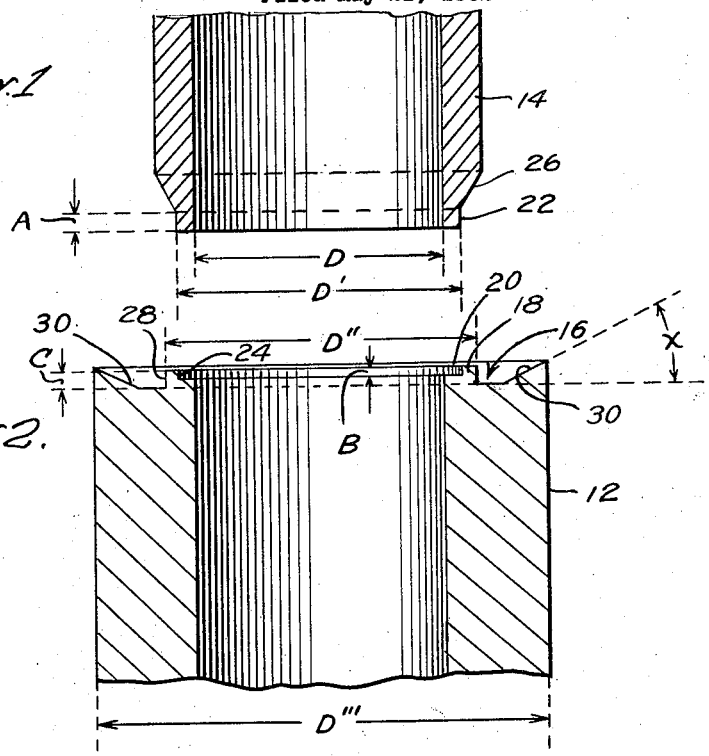
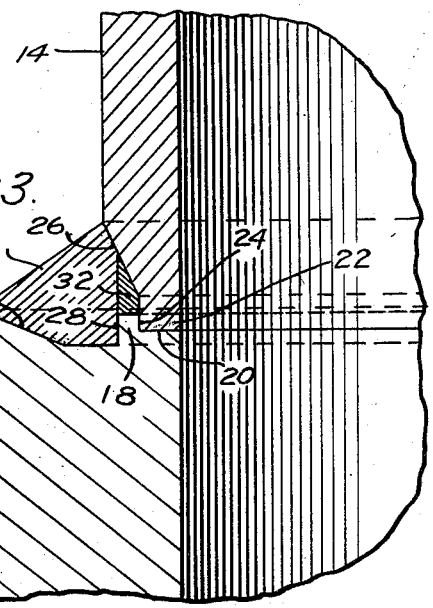
INVENTOR
LEONARD JAMES CULVER
BY Richard H. Thomas
ATTORNEY

United States Patent Office 3,195,229
Patented July 20, 1965

3,195,229
METHOD OF BUTT WELDING METAL TUBES
Leonard James Culver, Purley, Surrey, England, assignor to Foster Wheeler Corporation, New York, N.Y., a corporation of New York
Filed May 21, 1962, Ser. No. 196,049
5 Claims. (Cl. 29—482)

This invention relates to the joint welding of metal tubes.

The steam pressures and temperatures used in boiler installations today are so high that in many cases the conventional type of mechanical and expanded joint between tube ends and between tubes and headers must be replaced by a welded joint. The simplest type of welded joint for tubes of the same internal diameter is the butt joint, but this has the two folowing important disadvantages:

First, an ordinary butt joint necessitates the use of a backing ring in order to avoid the presence of welding flash within the tube. The backing ring, in addition to constituting an undesirable construction generally leaves between it and the inside surface of the tube a crack which can be a source of corrosion.

Second, the ordinary butt joint involves uphand welding, i.e. welding at right angles to the axis of the tube. This is difficult to achieve when the tubes are close together as in the case of a modern marine boiler installation and precludes completion of the weld from a single welding position.

An improvement in this respect is achieved if one of the tube ends to be joined is cupped to receive the other, the space between the latter end and the cup being filled with weld metal. This has the advantage that the welding can be effected downhand or axialy instead of uphand and, in most cases, can be effected from a single welding position. Such downhand welding has the disadvantage, however, that full penetration of the weld to the inside of the tube is practically impossible to achieve and, consequently, a crack is left between the tube ends which can be a source of corrosion.

The invention is connected with improvements in these respects.

According to the invention, the end face of one of the tubes to be joined is machined to provide an annular lip or spigot adapted to locate the other tube, the end of which is reduced in thickness to fit within the lip or spigot. The radial thickness of the spigot and its distance from the bore of the tubes is such that a root weld can be run in the neighborhood of the spigot which will penetrate as far as the bore without resulting in flashing, and the other dimensions of the spigot are such that the spigot will completely fuse when the rot weld is run.

In accordance with another feature of the invention, the lip or spigot is formed so that its outer circumferential face, i.e. the outside surface of the spigot which parallels the bore, is somewhat greater in depth than the inner circumferential face of the spigot, and the end face of the tube on which the spigot is formed is dished outside of the spigot to form with the spigot a shallow annular trough or cup in which additional weld metal can be deposited to complete the joint.

The tubes can be of the same thickness or of different thicknesses and the spigotted tube can be in the form of a stub projecting from, say, a header.

The invention can also be used for welding tubes directly to a header in which case, the header is machined to provide on it the above-mentioned lip or spigot.

Further details of the invention will become apparent upon consideration of the following description, with reference to the accompanying drawings, in which:

FIGURE 1 illustrates in section a tube member having one end machined to mate with a spigotted tube according to the invention:

FIGURE 2 illustrates in section a tube or header machined to form a lip or spigot in accordance with the invention: and FIGURE 3 is an enlarged partial section view illustrating joined tube members in accordance with the invention.

Referring to FIGS. 1 and 2, there is illustrated a thick tubular member 12 (FIG. 2) which may be either a tube or a stub projecting from a header, not shown. To that member, tube 14 (FIG. 1) is to be butt welded, which tube is thinner but of the same internal diameter, and may, as an example, be a superheater tube.

The end face 16 of the stub 12 (FIG. 2) is machined so that there stands up from it an annular lip or ridge 18, which, for the purposes of this description, will be hereafter referred to as the spigot. The spigot encompasses or rims an annular space 20 receding from the bore of the tube. The end of the tube 14 is reduced in diameter so that it terminates in a narrow portion 22 arranged so as to have, when the tubes are axially aligned, walls parallel to those of the spigot, and also to have an external diameter substantially equal to the inside diameter of the spigot, defined by the circumferential face or surface 24 and embracing the annular space 20. The length of the end portion 22 also is somewhat greater than the inside height of the spigot or the height of surface 24. The tube 14 is tapered at 26 to provide an easy transition from the part of full diameter to that of reduced diameter.

Referring back to FIG. 2, the outside surface or circumferential face 28 of the spigot 18 is of somewhat greater height than the inside surface or face 24, and the end face of the tube 12 is dished to form with the spigot a shallow annular trough or cup 30, the outside edge of which extends only slightly, in an axial direction, beyond the top of the spigot.

The tube ends having been so prepared, the reduced end 22 of the tube 14 is inserted into the space 20 within the spigot 18 (FIG. 3), the outer surface of the end 22 mating with the inside surface 24 of the spigot, and a root weld 32 is run in the neighborhood of the spigot.

The dimensions of the spigot are chosen so that the spigot is completely fused in the course of the running of the root weld. Also, the radial distance of the spigot from the inside surface of the tube 12 is chosen such that, having regard to the welding conditions and the size of the spigot, the root weld penetrates just as far as the bore of the tube. It is found that with the preparation described above, the achievement of such penertation involves only the use of oridnary welding techniques and leads to no objectionable flashing.

The root weld having been run, it remains then only to complete the joint by running a fillet weld 34 into the space defined by the surface 26 on the tube 14 and the annular trough 30 in the tube 12.

Both the root weld and the fillet weld can be run downhand with the consequence that the welding can be completed from one position, even if the tubes being joined are situated very close to neighboring tubes.

The shallowness of the trough 30 is important. If the trough were in the form of a deep cup with its outer rim extending axially a substantial distance beyond the level at which the joint between the tubes is to be made, it would be impracticable or physically difficult to run a root weld and to achieve full penetration to the inside surfaces of the tubes. It is of importance also to note that the trough is formed by machining the end of the wider tube, or that tube on which a trough can be formed without the necessity of increasing the diameter of the tube. This is advantageous when, for example, a relatively thin superheater tube welded to a header stub has to be cut out and replaced. The removal of the weld metal to expose the base metal of the stub is relatively simple and does not involve the removal of much of the base metal. The cleaned-up tube end then becomes available for being re-machined.

The distance of the spigot from the inside surface is also important. It must be substantial enough to insure that the root weld can be run without the danger of flashing occurring in the absence of a backing ring. On the other hand, it determines to some extent the dimensions of the spigot, so that, having regard to the welding conditions, the metal of the spigot will penetrate into the crack or space between the tube ends and, by filling it, will remove a possible cause of corrosion of the joint.

The best dimensions to be used in the preparation of the tube ends can be determined without great difficulty by trial and error. A set of typical dimensions related to the inside diameter of the tubes is as follows, referring to FIG. 3:

*Table I*

$D$ = Inside diameter of tubes
$D^1 = D + \frac{1}{8}''$
$D^{11} = D + \frac{3}{16}''$
$D^{111} = D + \frac{1}{2}''$
$A = \frac{1}{16}''$
$B = \frac{1}{32}''$
$C = \frac{1}{16}''$
$X = 25°$ Many modifications will be apparent to those skilled in the art, and the invention is to be interpreted as defined in the following claims.

What is claimed is:

1. A method of preparing metal tubes of the same internal diameter for being butt welded comprising the steps of machining the end face of one of the tubes to provide an axially extending annular spigot and an inner annular shoulder extending radially from the bore of the tube and encompassed by the spigot, said spigot being formed so that its outer circumferential face is of somewhat greater height than its inner circumferential face and the end face of the tube on which the spigot is formed is dished to form with the spigot a shallow annular trough encompassing the spigot, machining the end of the other tube so that it is reduced in thickness to fit within the spigot and to seat on said shoulder, the radial distance of the spigot from the bore of the tubes being such that a root weld run in the neighborhood of the spigot can be caused to penetrate as far as the bore without flashing occurring, and the other dimensions of spigot being such that the spigot will substantially completely fuse when the root weld is run.

2. A method according to claim 1 in which said annular trough is formed so that its outside peripheral edge extends only slightly beyond the top of the spigot in a direction parallel to the axis of said tube and in which the length of the reduced end is approximately twice as long as the inner circumferential face.

3. A method of butt welding metal tubes of the same internal diameter comprising the steps of machining the end face of one of the tubes to provide an upstanding annular spigot and an inner annular shoulder extending radially from the bore of the tube and encompassed by the spigot, said spigot being formed so that its outer circumferential face is of somewhat greater height than its inner circumferential face and the end face of the tube on which the spigot is formed is dished to form with the spigot a shallow annular trough encompassing the spigot, machining the end of the other tube so that it is reduced in thickness to fit within the spigot and to seat on said shoulder, the radial distance of the spigot from the bore of the tubes being such that a root weld run in the neighborhood of the spigot can be caused to penetrate as far as the bore without flashing occurring, said spigot fusing and flowing into and filling any space between the tube ends upon running the root weld, and the other dimensions of the spigot being such that the spigot will substantially completely fuse when the root weld is run, said method including the further steps of abutting said pair of tubes, running a root weld in the neighborhood of the spigot so as to achieve a penetration of the weld as far as the bore of the tubes and completing the joint by the deposition of a fillet weld outside the root weld.

4. A method according to claim 3 in which said annular trough is formed so that its outside peripheral edge extends only slightly beyond the top of the spigot in a direction parallel to the axis of said tube.

5. A method according to claim 3 wherein:
said annular trough is formed so that its outside peripheral edge extends only slightly beyond the top of the spigot in a direction parallel to the axis of said tube,
the length of said reduced end is approximately twice as long as the inner circumferential face, and
said other tube is machined so as to have a tapered surface between said end of reduced thickness and the portion of full diameter, said fillet weld being contained in and filling the area defined by said tapered surface and said trough.

References Cited by the Examiner

UNITED STATES PATENTS

| | | | |
|---|---|---|---|
| 1,935,063 | 11/33 | Scott | 29—486 X |
| 2,867,036 | 1/59 | Hovelmann | 29—482 X |
| 2,967,352 | 1/61 | Weil | 29—479 |
| 2,996,600 | 8/61 | Gardner et al. | 29—498 X |

JOHN F. CAMPBELL, *Primary Examiner.*